M. Rubel,

Cutlery.

No. 3,571. Reissued July. 27. 1869.

Witnesses
G. F. Chapin
A. Haynard

INVENTOR.
Moses Rubel

N. PETERS, PHOTO-LITHOGRAPHER, WASHINGTON, D. C.

UNITED STATES PATENT OFFICE.

MOSES RUBEL, OF CHICAGO, ILLINOIS.

IMPROVEMENT IN CUTLERY.

Specification forming part of Letters Patent No. 78,328, dated May 26, 1868; reissue No. 3,571, dated July 27, 1869.

*To all whom it may concern:*

Be it known that I, MOSES RUBEL, of the city of Chicago, in the county of Cook and State of Illinois, have invented certain new and useful Improvements in Cutlery; and I do hereby declare that the following is a full, clear, and exact description thereof, reference being had to the accompanying drawing, making a part of this specification, in which—

Figure 1:
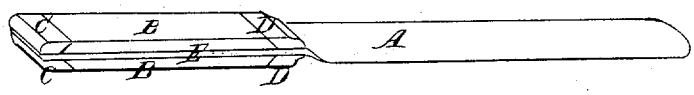
Figure 2:
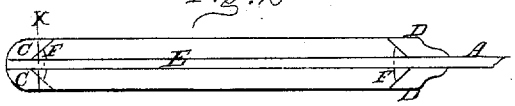
Figure 2:
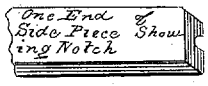
Figure 3:
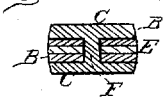

Figure 1 is a perspective view of my invention applied to a knife; Fig. 2, a back view of handle with the scales removed, and Fig. 3 a section taken on line *x* of Fig. 2.

Like letters refer to the same parts in all of the figures.

The object of my invention is to secure the scales or handle-pieces to the shank so as to dispense with the use of rivets; and its nature consists in attaching and securing the scales to the shank by means of bolsters and tips cast upon or around each end of the scales and the shank, and in casting the lugs which unite the parts of the bolsters or tips through or into the notches or openings of the scales.

I am aware that the inner ends of the scales have been secured to the shank by means of a bolster cast on or through the same, and rivets to secure the outer ends; but when single bolsters were so cast the lugs which united the parts were not so placed or located with reference to the scales as to prevent the lateral displacement of the scales; and when the scales are riveted at the outer ends they are liable to be split in manufacturing, and to crack or warp in use from frequent immersion in hot water, and rivets also give a less finished appearance to the completed article.

To enable others skilled in the art to make and use my invention, I will proceed to describe the same.

A represents the blade of a table-knife, which is extended so as to form the shank E. B B are the scales or handle-pieces, which are made of wood or of other suitable material, and are so beveled or tenoned at the ends that the sides fitting the shank are longest, so that the metal composing the bolsters D D and tips C C, when cast upon the shank, will lap over or around each end of the scales, and hold them firmly in place. When beveled or rabbeted at the ends these scales are provided with a notch, as shown in red in the drawings, and when tenoned the connection of the bolsters or tips may be made in the center or at the sides of the shank, as desired. The lugs F, which form a part of the bolster or tip, pass through or into these notches or openings, and prevent the scales from sliding out or from lateral displacement. The bolsters D D and tips C C are made of any suitable metal which will not burn the scales in casting, and are secured to the shank by being cast upon it, and through the holes in the shank, which are made to correspond with those on the scales. The metal flowing through such holes or openings makes such bolsters or tips of one piece, and when cast on secures them to the shank, and fastens the scales in their places, thereby entirely dispensing with the use of rivets, and the lugs F being so located as to connect the sides of the bolsters partially in their projecting parts, as shown at Fig. 2, and through or into the notches or openings of the scales, makes a very strong joint between the bolster and the scale, and secures the bolsters to the shanks much stronger than by any method heretofore practiced.

The process of casting is as follows: The scales are clamped to the shank by an iron mold, which has suitable holes and openings for pouring the metal, and casting the bolsters and tips around the ends of the scales at the proper places. The metal is poured in in the usual manner of making similar castings. The handles are then finished off in the usual mode.

If ornamental tips or bolsters are desired, they are cast on by proper molds formed for that purpose.

Having thus fully described my improvements, what I claim as new, and desire to secure by Letters Patent, is—

1. The tips C C and bolsters D D, provided with projections F, or their equivalents, to prevent the lateral displacement of the scales, cast onto, and in combination with, the tang E, passing through the handle, so as to connect the bolsters and tips, and fasten the scales without rivets, substantially as specified.

2. The lugs F, when so located as to project beyond that part of the bolsters and tips which is in contact with the tang, in combination with the corresponding notches in the scales, substantially as and for the purposes specified.

MOSES RUBEL.

Witnesses:
H. D. SOUYA,
H. KERKER.